United States Patent [19]

Brautigam

[11] 4,137,900
[45] Feb. 6, 1979

[54] SOLAR HEATING SYSTEM

[76] Inventor: Robert F. Brautigam, P.O. Box 102, Agenda, Kans. 66930

[21] Appl. No.: 854,079

[22] Filed: Nov. 23, 1977

[51] Int. Cl.² ............................................. F24J 3/02
[52] U.S. Cl. .................................. 126/271; 126/400; 165/104 S; 237/1 A
[58] Field of Search ..................... 126/270, 271, 400; 237/1 A; 165/104 S; 62/430

[56] References Cited

U.S. PATENT DOCUMENTS

| | | | |
|---|---|---|---|
| 3,799,145 | 3/1974 | Butterfield | 126/271 |
| 4,021,895 | 5/1977 | Morse | 126/271 |

Primary Examiner—Kenneth W. Sprague
Assistant Examiner—James C. Yeung
Attorney, Agent, or Firm—John A. Hamilton

[57] ABSTRACT

A solar heating system including a specially designed tank divided into zones in which heat is stored in water, the hottest water in each zone rising to the top thereof by convection. A solar flow circuit draws water from the bottom of the coldest zone, and delivers it through a solar heat collection device back to the bottom of the hottest zone it is capable of heating. A heating flow circuit is drawn from the top of the hottest zone and delivered through a heat dispersing device in a comfort zone back to the top of the coldest zone, and then across the tops of the zones back to the hottest zone. An auxiliary heater fired by external fuel is provided to supply heat when the solar unit cannot carry the heating load. Provision is also made for collecting heat from any other external source available and storing it in the tank, so as to reduce any load on the auxiliary heater. In all cases heat supplied to the tank is inserted into the hottest zone thereof in which it is capable of elevating the water temperature, so as to render that heat more quickly and readily available for heat load use.

10 Claims, 3 Drawing Figures

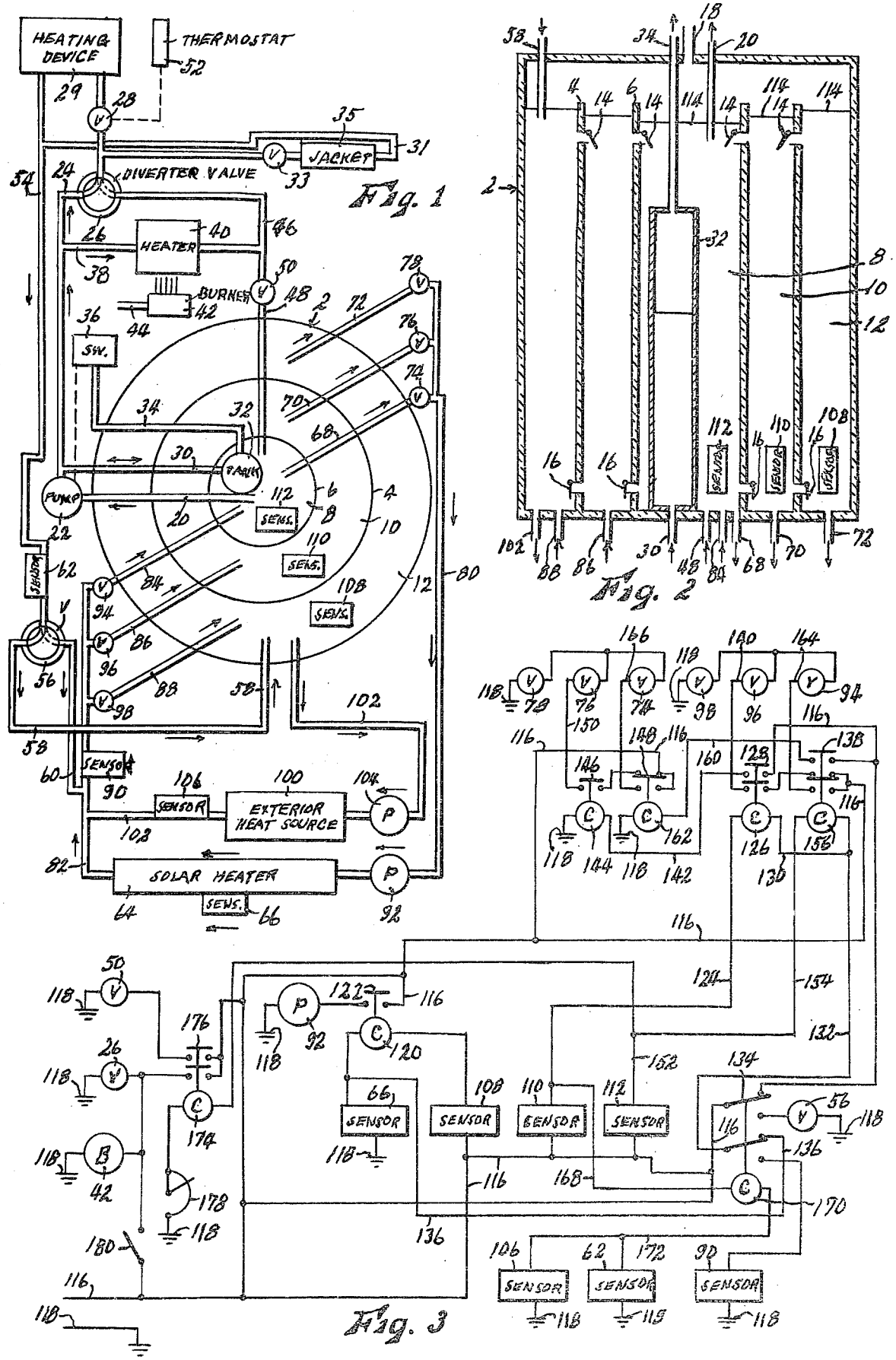

SOLAR HEATING SYSTEM

This invention relates to new and useful improvements in solar heating systems, and has particular reference to the heat collection and storage components of such a system.

A universal problem in solar heating systems is, of course, that solar heat collection devices are capable of collecting heat at usable levels for only a portion of each day, generally that portion during which the sun is shining to some extent, so that some means is required to store any excess solar heat produced by the solar unit during these "active" periods for later use in periods when it is relatively "inactive" in which it cannot produce heat at usable levels. An auxiliary heater fired on external fuel can be used to supply heat when the solar unit cannot carry the heating load, but any available heat stored as just described will of course reduce the load on the auxiliary heater and thus provide a valuable fuel saving. The provision of a new and novel system for collecting and storing this excess solar heat is a primary object of the present invention.

The heart of the present system is a novel heat storage tank in which heat is stored in a liquid medium such as water. The tank is divided by suitable partitions into a series of vertically concentric rings, with inwardly opening check valves near the tops of the partitions, and outwardly opening check valves near their bottoms. Water to supply the heat demands of the comfort zone is drawn from the top of the center ring and normally returned to the outer ring. This will be termed the "heating flow", and creates a current through the top check valves from the outermost tank ring to the center ring. At the same time, water drawn from the bottom of the tank is circulated through a solar heat collection unit and returned to the bottom of the tank. Being heated at this time, it rises through the tank rings, heating the water therein, the hottest water in each ring rising therein by convection so that the hottest water is concentrated at the top of each ring and enters the heating flow to the center ring, and also generally elevating the temperatures of the entire tank, this general temperature rise representing stored heat which may be used in the heating flow at other times when the solar unit is not active. The center ring will thus normally contain the hottest water of the tank, with progressively cooler water in successively outward rings.

Another object is the provision of a system of the character described with provisions that the water flow to and from the solar unit is normally drawn from and returned to the same tank ring, that ring being the innermost ring in which the water temperature is such that the solar return is still capable of further elevating its temperature. This tends to concentrate the entering heat toward the center of the tank, rendering said heat more rapidly and readily available to the center ring for supplying the heating flow. At the same time, the solar flow, being drawn from and returned to the same tank ring in equal amounts, does not interfere with the heating flow inwardly across the tops of the tank rings, which is gravity-induced by differences of the water levels in the various rings. Of course, the solar flow may then be to an inner ring if it is capable of elevating the water temperature therein, and if so any tank rings outward therefrom will not be receiving and storing solar heat, but immediate availability of the solar heat for heating flow usage is considered more important than the storage.

Another object is the provision of a system of the character described including an auxiliary heater operable to supply additional heat to the tank, or directly to the comfort zone heating device, whenever the solar unit, plus the heat stored in the tank, is not sufficient to carry the heating load.

Another object is the provision of a system of the character described including means operable to collect, store and use heat from external sources other than the solar unit, whenever such sources are available. Returns from such external sources are normally fed to the hottest tank ring the temperature of which is still exceeded by the return, thereby rendering the heat thereof more readily available for use in the heating flow, but provision is made that when the heat from these sources is sufficiently great to justify it, a portion of the return may be diverted to rings still further from the center ring, in order to store heat therein.

With these objects in view, as well as other objects which will appear in the course of the specification, reference will be had to the accompanying drawing, wherein:

FIG. 1 is a flow diagram of a solar heating system embodying the present invention, FIG. 2 is a vertical sectional view through the tank shown in FIG. 1, and FIG. 3 is a wiring diagram of the system.

Like reference numerals apply to similar parts throughout the several views. The numeral 2 applies generally to the heat storage tank forming the central element of the system. It is a large tank, a capacity of several thousands of gallons being recommended to insure the best possible heat storage capacity for an average dwelling. It may be vertically cylindrical as shown, and is divided by concentric cylindrical partitions 4 and 6 extending from the tank bottom to a point spaced apart from its top, into a central compartment 8 surrounded by annular compartments 10 and 12 of successively greater diameters. Any number of tank rings desired may be used. For convenience, these compartments will be referred to as tank "rings". Each of partitions 4 and 6 is provided around its periphery, and adjacent its upper edge, with inwardly opening check valves 14, and adjacent its lower edge with outwardly opening check valves 16, as indicated in FIG. 1. The tank is filled with a liquid medium such as water, to a level below the tops of the partitions, the liquid level in all of the tank rings tending to be equalized by flow through the check valves. Both the tank walls and the partitions are preferably thermally insulated, as indicated in FIG. 2, to minimize heat transfer therethrough, and the tank top is vented to atmosphere as at 18.

The heating flow is drawn from the top of center tank ring 8, where as will appear the hottest water in the tank is concentrated, through a conduit 20, by an electrically operated pump 22, and delivered thereby through a conduit 24, a two-position diverter valve 26 and a control valve 28 to a fluid-operated heating device 29 operable to disperse heat into a comfort zone. Pump 22 also delivers water through a conduit 30 branching from conduit 24 to the bottom of a pressure tank 32 mounted in center ring 8 of tank 2. This pressurizes air in tank 32 above the water level of said tank and this pressure reacts through a conduit 34 interconnected into the top of the tank to control a pressure-sensitive electric switch 36, whereby pump 22 is actuated whenever the air pressure drops to a predetermined lower level, and deactuated whenever said air pressure rises to a predetermined higher level.

Intermediate pump 22 and diverter valve 26, conduit 24 is provided with a second branch conduit 38 whereby water delivered by the pump may be delivered to an auxiliary heater 40 in which the water is heated by a burner 42 supplied with external fuel at 44. The heater is actuated whenever burner 42 is operative. The output of the heater is connected by conduit 46 to diverter valve 26, and also by conduit 48 into the bottom of center tank ring 8. In conduit 48 there is interposed an electrically operable valve 50 which is normally closed, but which opens when electric power is furnished thereto. Diverter valve 26 is also electrically operable and has two positions, normally being positioned as shown in solid lines to connect conduit 24 to heating device 29, but being movable to a second position, shown in dotted lines, wherein it closes to conduit 24 and connects heater outlet conduit 46 to heating device 29, whenever electric power is supplied thereto. Control valve 28 is operable to be opened by a thermostat 52 disposed in the comfort zone, whenever that zone calls for heat. It is often called a "zone" valve, since many heating systems service several zones to be individually regulated, in which case each zone is provided with a separate zone valve 28, connected in parallel with the valve 28 shown and each controlled by a thermostat in the affected zone.

Water returning from the heating device 29 is carried through a conduit 54 to a second diverter valve 56, which is also an electrically operated two-position valve, normally positioned as shown in solid lines to deliver water from conduit 54 to a conduit 58 which delivers said water into the top of outermost ring 12 of tank 2. When electric power is supplied thereto, valve 56 moves to a second position, shown in dotted lines, wherein it delivers water from conduit 54 to another conduit 60 to conduct it back to tank 2 by another route, to be described herein below. Interposed in conduit 54 is a temperature sensor 62 which measures the temperature of the water in that conduit. Said sensor may be a thermistor, which is an electrical resistor the resistance of which varies with the temperature to which it is subjected. All of the sensors shown may be of this type.

Indicated at 64 is a solar heat collection unit. It may be of any suitable specific type, although generally it consists of a housing having a skin exposed to solar radiation, whereby to heat water circulated through the housing when the skin temperature rises high enough to do so. A temperature sensor 66 is mounted on the solar unit to detect the skin temperature thereof. This temperature should be the temperature to which water circulated through the unit will be heated, or at least bear some reasonably accurate relationship thereto.

Water for circulation through the solar unit is drawn from the bottom of any one of the three tank rings 8, 10 and 12, respectively by conduits 68, 70 and 72. These conduits are controlled respectively by electrically operated valves 74, 76 and 78, valves 74 and 76 being normally closed, but opened when electric power is supplied thereto, while valve 78 is normally open, but closed when electric power is supplied thereto. These valves discharge into a common conduit 80 which is connected to an electrically operated pump 92, which delivers the water to the inlet of solar unit 64, and the outlet of the solar unit is to a conduit 82 which branches into three conduits 84, 86 and 88 opening respectively into the bottoms of tank rings 8, 10 and 12. A temperature sensor 90 is interposed in conduit 82, and conduit 60 from diverter valve 56 is connected into conduit 82 upstream from said sensor. Conduits 84, 86 and 88 are controlled respectively by electrically operated valves 94, 96 and 98, of which valve 98 is normally open and valves 94 and 96 are normally closed, the position of each being reversed when electric power is supplied thereto. This flow to and from the rings of tank 2 will be termed the "solar flow".

If some other source of exterior heat is available, provisions are made for drawing it into the system for utilization. For example, water from conduit 24, intermediate diverter valve 26 and control valve 28, may be shunted through a branch conduit 31, a control valve 33, and the jacket 35 of a water-jacketed fireplace, back to return conduit 54, if such a fireplace is available, so that water in the heating flow is heated in jacket 35, as well as cooled in heating device 29. Valve 33 is opened either manually, or automatically by any suitable means, whenever the fireplace is in use. Any other source of available external heat is represented at 100, and there of course might be a plurality of such sources. They might, for example, constitute a water-cooled engine, the exhaust heat from a refrigeration system, a heat pump operable to draw heat from the atmosphere in almost any weather, however cold, or others. To draw heat from such a source, water is drawn from the bottom of outer tank ring 12 through a conduit 102 by an electrically operated pump 104, and delivered by said pump to the external heat source 100, and thence through a sensor 106 to solar return conduit 82 upstream from sensor 90. It will be understood that pump 104 operates whenever exterior heat source 100 is operative to produce heat. Three other temperature sensors 108, 110 and 112 are disposed respectively in the lower portions of tank rings 12, 10 and 8, to sense the water temperatures therein.

Operation of the system will be described in connection with the electrical wiring diagram shown in FIG. 3. The diagram does not include pump 22, but as already described this pump is actuated by pressure switch 36 whenever control valve 28 is opened by thermostat 52 as a signal that the comfort zone is calling for heat, the opening of the control valve causing a pressure drop in the line to which switch 52 is sensitive. Actually, heated water may pass to the heating flow from pressure tank 32, driven by air pressure in the tank, for a considerably time without operation of pump 22, until the air pressure falls to the point at which pressure switch 36 actuates the pump. This reduces the required operating time of the pump. Actuation of pump 22, or the pressure flow of water from tank 32, establishes the normal heating flow from the top of center tank ring 8 at 20, through pump 22 and diverter valve 26 (then in its solid line position), control valve 28, heating device 29, diverter valve 56 (then in its solid line position), and back to the top of outer tank ring 12 at 58. The removal of water at the center ring, and its return to the outer ring, tends to lower the liquid level 114 in the center ring and raise the level in the outer ring, so that the levels of the various rings grade upwardly outwardly from the center ring, as indicated in FIG. 2. This change of levels opens upper check valves 14 and closes lower check valves 16. Thus the normal heating flow, induced by gravity, is inwardly across the tops of the tank rings to the center ring, and does not involve flow in the lower portions of the rings.

Electric power for the system is derived from a pair of line wires 116 and 118, of which wire 116 will be termed the hot wire, and wire 118 the common return or ground. It will be seen that sensor 66 of the solar unit and sensor 108 in the bottom of outer tank ring 12 are connected in series between hot wire 116 and ground 118, with the coil 120 of a normally open relay 122 connected in series therebetween. These two sensors are so set that when sensor 66 indicates a solar temperature somewhat higher than that of the water in outer tank ring 12, signifying that the solar unit is then capable of delivering water hot enough to elevate the water temperature in ring 12, current will flow to coil 120 to close relay 122. The closure of relay 122 completes a circuit from hot wire 116 through pump 92 to ground whereby pump 92 is actuated to start the solar flow. Since none of the valves 74, 76, 78, 94, 96 or 98 are normally energized at this time, valves 78 and 98 are open, while valves 74, 76 94 and 96 are closed. Thus the solar flow is from the bottom of outer tank ring 12 through valve 78, pump 92, solar unit 64, and back to the bottom of outer tank ring 12 at 88 through valve 98. The heated water thus delivered to ring 12 tends to rise in that ring, the hottest water in the ring rising therein by convection to the top of the ring where it enters the inward movement of the heating flow across the tops of the rings for fast delivery to the center ring 8. Cooler water will be disposed in the lower portions of ring 12, but the general temperature level thereof will of course be elevated. Since this normal solar flow is taken from and returned to the same tank ring, in equal amounts, it does not affect the water level in ring 12, and hence does not interfere with the gravity-induced heating flow across the tops of the tank rings.

Solar sensor 66 is also connected in series with sensor 110 of tank ring 10 in a circuit from hot wire 116 through sensor 110, wire 124, the coil 126 of a double pole relay 128, wires 130 and 132, a normally closed pole of a double-pole, double-throw relay 134, wire 136 and sensor 66 to ground. Thus when sensor 66 indicates that the solar temperature has risen to a point higher than the temperature of ring 10, which will normally be higher than that of ring 12, the circuit of sensors 66–110 will conduct current to coil 126 to close relay 128. The closure of relay 128 completes a circuit from hot wire 116 through a normally closed pole of a relay 138 and a now-closed pole of relay 128, through a wire 140 to valves 96 and 98, which are connected in series, to ground. This opens valve 96 and closes valve 98. The closure of relay 128 also completes a circuit from hot wire 116 through another now-closed pole of said relay, wire 142 and the coil 144 of a single-pole, normally open relay 146 to ground. Relay 146, thus closed, completes a circuit from hot wire 116 through a normally closed pole of a relay 148, the now-closed relay 146, wire 150, valves 76 and 78 connected in series, to ground, thus opening valve 76 and closing valve 78. The solar flow now is withdrawn from and returned to tank ring 10.

Sensor 112 of the center tank ring 8 is also connected in series with solar sensor 66 in a circuit from hot wire 116 through sensor 112, wires 152 and 154, coil 156 of relay 138, wire 132, a normally closed pole of relay 134, wire 136 and sensor 66 to ground. Thus whenever sensor 66 detects a solar temperature sufficiently high that the solar flow can elevate the temperature in the center ring, the circuit of sensors 66–112 actuates coil 156 to fire relay 138. This breaks the circuit of the normally closed pole of said relay, interrupting the circuit which previously operated valve 96 to open it, whereby valve 96 closes. The firing of relay 138 also completes a circuit from hot wire 116 through a now-closed pole of said relay, wire 160, and the coil 162 of relay 148 to ground. This fires relay 148, which interrupts the circuit previously supplying power to valve 76 to open it, whereupon valve 76 closes. The firing of relay 138 also completes a circuit from hot wire 116 through a now-closed pole of said relay, wire 164, valve 94 and valve 98 to ground, opening valve 94 and closing valve 98. The firing of relay 148, as just described, also completes a circuit from hot wire 116 through another now-closed pole of said relay, wire 166, and valves 74 and 78 to ground, whereupon valve 74 opens and valve 78 remains closed. The solar flow is now withdrawn from and returned to center tank ring 8.

Thus the normal solar flow is always drawn from and returned to the innermost tank ring in which it is capable of elevating the water temperature. This keeps the maximum amount of heat "pyramided" toward the center of the tank, which renders the heat more readily available to supply the heating load. Furthermore, by tending to maintain the outermost tank rings at the lowest temperatures, it reduces the temperature differential, and hence any heat loss, across the outer tank wall. By returning the solar flow to the same tank ring from which it was withdrawn, it does not interfere with the gravity-induced heating flow inwardly across the tops of the tank rings. When the temperature of center tank ring 8 rises to the solar temperature, as indicated by sensors 66–112, the selection system operated by the various relays is reversed, and the solar flow intake and return will back out to ring 10, and so on to the outermost tank ring, as the temperature of each ring rises to the solar temperature. Also, this "backing out" of the solar flow intake and return occurs when the solar temperature as indicated by sensor 66 begins to fall at the end of the "solar day", the ring selection process moving the solar flow intake and delivery to ring 10 when the solar flow temperature is no longer high enough to elevate the center ring temperature, and to outer ring 12 when the solar flow temperature is reduced below that of ring 10. When the temperature of the entire tank is elevated to solar temperature, or when the solar flow temperature drops below that of outer ring 12, relay 122 is released and solar flow pump 92 is turned off. Of course, the solar flow may operate, storing heat in the tank, even when the heating flow is not operative, as would occur if there were no heating demand and pump 22 was not operating. If the solar flow were started with the tank entirely cold, it would deliver heat first to the center ring, then to ring 10 when it could no longer elevate the temperature further in the center ring, and so on. If it could operate for a sufficient time under these conditions, the entire tank contents could be elevated to the maximum temperature deliverable by the solar unit.

Extra heat may be captured in the system, as previously mentioned, from sources other than the solar unit. One of the extra sources is exterior heat source 100, which may be any of those discussed, or any other suitable type. Another is the fireplace water jacket 35 in shunt conduit 31 of the heating flow. In either case, as will appear, water may be returning to tank 2 at a ring thereof spaced inwardly from the ring of the tank from which it was withdrawn, which would impede the gravity-induced heating flow through upper check valves 14 inwardly across the tops of the tank rings, by raising the water level 114 in a relatively inward ring as compared to any rings outward from the high-level ring. This of course cannot be permitted. Also, if water jacket 35 is the external heat source, water returned to the top of outer tank ring 12 at 58 may be hotter than the water temperature in any of the tank rings, with the result that it would be shunted or "short-circuited" across the tops of the tank rings in the normal heating flow to the center ring 8, with no opportunity to store some of its heat in the outer rings. This also is not desirable.

In the present system, it will be seen that whenever heat is being extracted at 35 or 100, one of sensors 62 or 106 can detect that the return flow of either conduit 54 or conduit 102 is at a higher temperature than tank ring 10. Sensors 62 and 106 are connected in a circuit extending from hot-wire 116 through sensor 110 of tank ring 10, wire 168, the coil 170 of relay 134, wire 172, sensors 62 and 106 connected in parallel, and to ground. Thus whenever the temperature of either sensor 62 or 106 rises above that of tank ring 10, relay 134 is fired. The firing of relay 134 has several effects. It interrupts the power supply to the pole of relay 138 which previously supplied power to fire relay 148 to open valve 74, and the pole of relay 128 which previously supplied power to close relay 146 to open valve 76, whereby valves 74 and 76 must remain closed, with valve 78 in its normal open position. Thus the entire solar flow and the flow of external heat source 100 must be drawn from the outer tank ring. It completes the circuit of diverter valve 56, whereby said valve moves to its dotted line position to divert the heating flow return through conduit 60 into the solar return conduit 82. Finally, it removes solar sensor 66 from the circuits of sensors 110 and 112, and substitutes sensor 90 therefor, so that thereafter relays 128 and 138 will respond to the temperature at sensor 90, relative to those in tank rings 10 and 12, to control valves 94, 96 and 98 to deliver the returns to the innermost ring of the tank of which they are capable of elevating the temperature. The possibly excessively hot heating system return is thus fed to the bottoms of the tank rings, in order to prevent any short-circuiting of the heating flow return over the tops of the tank rings.

If at any time the returns to a relatively inward ring of the tank exceed the quantity of water extracted from the outer ring at 72 and 102, then the water level 114 in that ring may rise above the level in any rings outward therefrom, but this will not block the heating flow. The heating flow from the high-level ring will continue toward center ring 8 as before, with the hottest water of the high-level ring, while the bottom check valve 16 between that ring and the next outward tank ring will open, due to the liquid level changes, so that the cooler water in the high-level ring passes to said next outward ring to store heat therein. When the temperature at sensors 62 and 106 again drops below that of sensor 110, relay 134 will drop out and the system operation returns to normal.

The coil 174 of a double-pole relay 176 is interposed in a series circuit between sensor 112 of the center tank ring and an adjustable resistor 178. Resistor 178 is set to fire relay 176 when the center ring temperature drops to a temperature at which water drawn therefrom can no longer effectively operate heating device 29, say about 85 deg. Fahr. Whenever this happens, due to a high heat demand compared to the heat supply from all sources, the firing of relay 176 closes the circuits of diverter valve 26, moving it to deliver the heating flow to heater 40 rather directly to the heating system, closing the circuit of valve 50 to open it, and closing the circuit of burner 42 to actuate heater 40. Pump 22 is actuated by the pressure drop occasioned by opening valve 50, if it is not already operating to supply the heating device. The output flow of heater 40 is then divided, going partially to the heating device through conduit 46 to insure continued effective operation thereof, and partially back to the bottom of center tank ring 8 through conduit 48 and open valve 50, whereby to start the building of a heat reserve therein. Of course it heats water only in center ring 8. Whenever the center ring temperature is built up to some pre-set level, relay 176 drops out and the system returns to normal operation. Nearly the same auxiliary heater flow may be initiated at any time, even if sensor 112 is not indicating heat starvation of center ring 8 by closing a manual switch 180 under a human operator's control. This actuates diverter valve 26, and heater 40, but leaves valve 50 closed. Thereupon the entire output of the heater is delivered directly to heating device 29 to provide "quick heat" to start operation thereof. Pump 22 is actuated by pressure switch 36, which functions to actuate the pump in response to the pressure drop in the heating flow caused by the opening of any of valves 28, 33 or 50.

While I have shown and described a specific embodiment of my invention, it will be readily apparent that many minor changes of structure and operation could be made without departing from the spirit of the invention.

What I claim as new and desire to protect by Letters Patent is:

1. A solar heating system comprising:
   a. a large tank divided by suitable partitions into a series of vertically concentric rings, and substantially filled with liquid,
   b. means adjacent the tops of said partitions and operable to permit the flow of liquid from ring to ring inwardly from the outermost ring to the center ring, but not outwardly,
   c. a liquid-operated heating device operable to disperse heat from a heated liquid passed therethrough into a comfort zone,
   d. a heating flow circulating means operable to draw liquid from the top of the center ring, pass it through said heating device, and return it to the top of the outermost ring, thereby establishing a gravity-induced flow of liquid inwardly across the tops of said tank rings,
   e. a solar heat collection device adapted to be exposed to solar radiation to heat liquid circulated therethrough, and
   f. a solar flow circulating means operable to draw liquid from the bottom of selected rings of said tank, circulate it through said solar heat collection device, and return it to the bottom of selected rings of said tank, whereby heat deposited in said tank by said solar flow rises to the top of said tank rings by convection to enter said heating flow.

2. A solar heating system as recited in claim 1 with the addition of control means in said solar flow operable to deliver any water removed from the bottom of any ring of the tank to said solar flow back to the same tank ring, whereby the return of said solar flow to said tank cannot disturb or impede said gravity-induced heating flow across the tops of said rings.

3. A solar heating system as recited in claim 2 including selector means for withdrawing liquid to said solar flow selectively from any one of the tank rings, and returning the solar flow selectively to any one of said tank rings, and with the addition of temperature-sensitive control means operable to set said selector means to withdraw the solar flow from, and return it to, the innermost tank ring the liquid temperature of which is exceeded by the returning solar flow.

4. A solar heating system as recited in claim 3 wherein said selector means comprises:
 a. a series of exit valves each controlling the exit of liquid from one of the tank rings to said solar flow,
 b. a series of entry valves each controlling the entry of liquid to one of the tank rings from said solar flow, the exit and entry valves of the outermost tank ring normally being open, and wherein said temperature-sensitive control means comprises
 c. a first temperature sensing means operable to initiate said solar flow circulating means whenever the solar temperature exceeds the liquid temperature in the outermost tank ring, and
 d. a series of additional temperature sensing means operable successively to close the exit and entry valves of each tank ring, and to open the exit and entry valves of the next inward ring, as the solar temperature exceeds the liquid temperature in said next inward ring, and to close said exit and entry valves of each ring, and open the exit and entry valves of the next outward ring, when the solar temperature falls below the temperature of that ring, or when the solar flow return temperature no longer exceeds the temperature of that ring.

5. A solar heating system as recited in claim 3 including a heat collection device in said heating flow and operable to heat liquid in said heating flow, and with the addition of:
 a. a heat-sensitive device operable whenever the heating flow return to said tank exceeds the temperature of the next inward tank ring from its outermost ring, to divert said heating flow return from the top of said outermost tank ring to said solar flow return, at a point thereof common to the solar return to all of the tank rings, and
 b. means adjacent the bottoms of the tank partitions and operable to permit the flow of liquid from ring to ring outwardly from the center ring to the outermost ring, but not inwardly.

6. A solar heating system as recited in claim 3 with the addition of:
 a. an external heat source operable to heat liquid circulated thereto,
 b. an external flow circulating means operable to draw liquid from the outermost ring of the tank to said external heat source and back to the return of said solar flow,
 c. a heat-sensitive means operable whenever the exterior flow return temperature exceeds that of the first ring inward from the outermost ring to divert the heating flow return from the top of the outermost ring to the solar flow return, and
 d. means adjacent the bottoms of the tank partitions and operable to permit the flow of liquid from ring to ring outwardly from the center ring to the outermost ring, but not inwardly.

7. A solar heating system as recited in claim 1 wherein liquid may be withdrawn from and returned to the bottom of any one of said tank rings, and with the addition of:
 a. a series of exit valves each controlling the exit of liquid from one of said tank rings to the solar flow,
 b. a series of entry valves each controlling the entry of liquid to one of the tank rings from the solar flow, the entry and exit valves of the outermost tank ring being normally open,
 c. a first temperature-sensitive means operable to sense the solar temperature and to initiate the solar flow circulating means whenever this temperature exceeds the temperature of the outermost tank ring,
 d. a series of second temperature-sensitive means operable successively to close the entry and exit valves of each tank ring as the solar temperature exceeds the temperature of the next inwardly adjacent tank ring, and to open the exit and entry valves of said next inwardly adjacent tank ring, and to close the exit and entry valves of each ring and open the exit and entry valves of the next outwardly adjacent ring, either when the solar temperature no longer exceeds the temperature of that ring, or when the temperature of the solar return is no longer higher than the temperature of that ring,
 e. a first auxiliary heat collection device operable to induce heat into said heating flow exteriorly of said tank,
 f. a second auxiliary heat collection device operable to induce heat into said solar flow,
 g. an auxiliary flow system operable to draw liquid from the outermost tank ring and circulate it through said second auxiliary heat collection device and back to the solar flow downstream from said solar heat collection device,
 h. third temperature-sensitive means operable, whenever either the heating flow return or the solar flow return to the tank exceeds the temperature of the second outermost tank ring, to close all solar flow exit valves except that of the outermost tank ring, to divert the heating flow return to a point of the solar flow return common to said solar flow return and the return of said auxiliary flow, and to remove said entry and exit valves from the control of said second temperature-sensitive means, and
 i. a fourth temperature-sensitive means disposed in a portion of the solar return common to all of the flows and operable to open only the entry valve of the innermost tank ring the temperature of which is exceeded by the temperature of said common return.

8. A solar heating system as recited in claim 1 with the addition of:
 a. a first conduit branching from said heating flow intermediate said tank and said heating device,
 b. a fuel-fired liquid heater disposed in said first branch conduit,
 c. a second conduit interconnecting the output of said fuel-fired heater into the heating flow downstream from said first branch conduit,
 d. a diverter valve at the juncture of said second conduit with said heating flow, normally positioned to interrupt said second conduit but not said heating flow, but operable when actuated to direct the heating flow through said first conduit, fuel-fired heater, and second conduit to said heating device, and
 e. a temperature-sensitive means operable to actuate said diverter valve and said fuel-fired heater whenever the liquid temperature of the center tank ring drops below a predetermined level.

9. A solar heating system as recited to claim 8 with the addition of:
   a. a third conduit interconnecting the output of said fuel-fired heater to the bottom of the center ring of said tank, and
   b. a normally closed control valve in said third conduit, said temperature-sensitive means being operable to open said control valve whenever it actuates said diverter valve and said fuel-fired heater.

10. A solar heating system as recited in claim 9 with the addition of manually operable means for actuating said diverter valve and fuel-fired heater, but not opening said control valve, whenever desired, independently of said temperature-sensitive means.

* * * * *